US011262213B2

United States Patent
Le Grand et al.

(10) Patent No.: US 11,262,213 B2
(45) Date of Patent: *Mar. 1, 2022

(54) DECOMPOSITION OF ERROR COMPONENTS BETWEEN ANGULAR, FORWARD, AND SIDEWAYS ERRORS IN ESTIMATED POSITIONS OF A COMPUTING DEVICE

(71) Applicant: Google LLC, Mountain View, CA (US)

(72) Inventors: Etienne Le Grand, Mountain View, CA (US); Brian Patrick Williams, Mountain View, CA (US)

(73) Assignee: Google LLC, Mountain View, CA (US)

( * ) Notice: Subject to any disclaimer, the term of this patent is extended or adjusted under 35 U.S.C. 154(b) by 20 days.

This patent is subject to a terminal disclaimer.

(21) Appl. No.: 16/884,150

(22) Filed: May 27, 2020

(65) Prior Publication Data
US 2020/0284611 A1 Sep. 10, 2020

Related U.S. Application Data

(63) Continuation of application No. 16/228,425, filed on Dec. 20, 2018, now Pat. No. 10,697,797, which is a (Continued)

(51) Int. Cl.
*G01C 25/00* (2006.01)
*H04W 4/02* (2018.01)
(Continued)

(52) U.S. Cl.
CPC ............ *G01C 25/00* (2013.01); *G01C 19/00* (2013.01); *G01C 21/12* (2013.01); *G01C 22/006* (2013.01);
(Continued)

(58) Field of Classification Search
CPC ...... G01C 19/00; G01C 21/12; G01C 22/006; G01C 25/00; G01C 25/005; G01S 19/49;
(Continued)

(56) References Cited

U.S. PATENT DOCUMENTS 6,006,158 A 12/1999 Pilley et al.
6,122,960 A 9/2000 Hutchings et al.
(Continued)

FOREIGN PATENT DOCUMENTS

WO 1995/022041 8/1995
WO 2013/037034 3/2013

*Primary Examiner* — John H Le
(74) *Attorney, Agent, or Firm* — McDonnell Boehnen Hulbert & Berghoff LLP

(57) ABSTRACT

Examples include systems and methods for decomposition of error components between angular, forward, and sideways errors in estimated positions of a computing device. One method includes determining an estimation of a current position of the computing device based on a previous position of the computing device, an estimated speed over an elapsed time, and a direction of travel of the computing device, determining a forward, sideways, and orientation change error component of the estimation of the current position of the computing device, determining a weight to apply to the forward, sideways, and orientation change error components based on average observed movement of the computing device, and using the weighted forward, sideways, and orientation change error components as constraints for determination of an updated estimation of the current position of the computing device.

20 Claims, 6 Drawing Sheets

Related U.S. Application Data continuation of application No. 15/275,648, filed on Sep. 26, 2016, now Pat. No. 10,197,418, which is a continuation of application No. 14/176,241, filed on Feb. 10, 2014, now Pat. No. 9,476,986.

(51) Int. Cl.

| | | |
|---|---|---|
| *G01S 19/13* | (2010.01) | |
| *H04W 4/029* | (2018.01) | |
| *G01C 21/12* | (2006.01) | |
| *G01C 22/00* | (2006.01) | |
| *G01S 19/49* | (2010.01) | |
| *G01S 5/02* | (2010.01) | |
| *G01C 19/00* | (2013.01) | |

(52) U.S. Cl.
CPC .............. *G01C 25/005* (2013.01); *G01S 5/02* (2013.01); *G01S 19/13* (2013.01); *G01S 19/49* (2013.01); *H04W 4/026* (2013.01); *H04W 4/027* (2013.01); *H04W 4/029* (2018.02)

(58) Field of Classification Search
CPC .......... G01S 5/02; G01S 19/13; H04W 4/026; H04W 4/027; H04W 4/028; H04W 4/029
USPC ......................................................... 702/94
See application file for complete search history.

(56) References Cited

U.S. PATENT DOCUMENTS

| | | | |
|---|---|---|---|
| 8,972,318 | B2 | 3/2015 | Prakash et al. |
| 9,476,986 | B2 * | 10/2016 | Le Grand .............. G01C 21/12 |
| 10,197,418 | B2 * | 2/2019 | Le Grand ............... G01S 19/13 |
| 10,697,797 | B2 * | 6/2020 | Le Grand ............ G01C 22/006 |
| 2012/0158289 | A1 | 6/2012 | Brush et al. |
| 2013/0325780 | A1 | 12/2013 | Prakash et al. |
| 2015/0149397 | A1 | 5/2015 | Prakash et al. |
| 2015/0226577 | A1 | 8/2015 | Le Grand et al. |

\* cited by examiner

DECOMPOSITION OF ERROR COMPONENTS BETWEEN ANGULAR, FORWARD, AND SIDEWAYS ERRORS IN ESTIMATED POSITIONS OF A COMPUTING DEVICE

CROSS-REFERENCE TO RELATED APPLICATION

The present disclosure claims priority to and is a continuation of U.S. patent application Ser. No. 16/228,425, filed on Dec. 20, 2018, which is continuation of U.S. patent application Ser. No. 15/275,648, filed on Sep. 26, 2016, which is a continuation of U.S. patent application Ser. No. 14/176,241, filed on Feb. 10, 2014. The entire contents of the aforementioned applications are incorporated herein by reference.

BACKGROUND

Unless otherwise indicated herein, the materials described in this section are not prior art to the claims in this application and are not admitted to be prior art by inclusion in this section.

A location of a computing device can be determined using many different techniques including based either on Global Positioning System (GPS) data or on data associated with a wireless access point, such as a cellular base station or an 802.11 access point. For example, a mobile computing device may receive a GPS signal and responsively determine its position on the face of the Earth (e.g. an absolute location). In a different example, a mobile computing device may receive a signal from either a cellular base station or an 802.11 access point. The cellular base station or an 802.11 access point may estimate an exact location. Based on the location of either the cellular base station or an 802.11 access point, the mobile computing device can calculate its exact position.

Within some instances, a localization of a mobile computing device may occur via use of data from multiple different networks. Many location based services can be provided to a mobile computing device based on determining the location of the mobile computing device.

SUMMARY

In one example, a method is provided that comprises determining an estimation of a current position of the computing device based on a previous position of the computing device, an estimated speed over an elapsed time, and a direction of travel of the computing device. The method further includes determining a forward error component of the estimation of the current position of the computing device, and the forward error component is indicative of error in the estimation of the current position along a forward direction of travel of the computing device. The method also includes determining a sideways error component of the estimation of the current position of the computing device, and the sideways error component is indicative of error in the estimation of the current position along a sideways direction that is substantially perpendicular to the direction of travel of the computing device. The method also includes determining an orientation change error component of the estimation of the current position of the computing device, and the orientation change error component is indicative of error in the estimation of the current position due to a change in the direction of travel of the computing device. The method also includes determining, by a processor, a weight to apply to the forward error component, the sideways error component, and the orientation change error component based on average observed movement of the computing device, and using, by the processor, the weighted forward error component, sideways error component, and orientation change error component as constraints for determination of an updated estimation of the current position of the computing device.

In another example, a computer readable memory having stored therein instructions, that when executed by a computing device, cause the computing device to perform functions is provided. The functions comprise determining an estimation of a current position of the computing device based on a previous position of the computing device, an estimated speed over an elapsed time, and a direction of travel of the computing device. The functions also comprise determining a forward error component of the estimation of the current position of the computing device, and the forward error component is indicative of error in the estimation of the current position along a forward direction of travel of the computing device. The functions also comprise determining a sideways error component of the estimation of the current position of the computing device, and the sideways error component is indicative of error in the estimation of the current position along a sideways direction that is substantially perpendicular to the direction of travel of the computing device. The functions also comprise determining an orientation change error component of the estimation of the current position of the computing device, and the orientation change error component is indicative of error in the estimation of the current position due to a change in the direction of travel of the computing device. The functions also comprise determining a weight to apply to the forward error component, the sideways error component, and the orientation change error component based on average observed movement of the computing device, and using the weighted forward error component, sideways error component, and orientation change error component as constraints for determination of an updated estimation of the current position of the computing device.

In still another example, a computing device is provided that comprises one or more processors, and data storage configured to store instructions that, when executed by the one or more processors, cause the computing device to perform functions. The functions comprise determining an estimation of a current position of the computing device based on a previous position of the computing device, an estimated speed over an elapsed time, and a direction of travel of the computing device. The functions also comprise determining a forward error component of the estimation of the current position of the computing device, and the forward error component is indicative of error in the estimation of the current position along a forward direction of travel of the computing device. The functions also comprise determining a sideways error component of the estimation of the current position of the computing device, and the sideways error component is indicative of error in the estimation of the current position along a sideways direction that is substantially perpendicular to the direction of travel of the computing device. The functions also comprise determining an orientation change error component of the estimation of the current position of the computing device, and the orientation change error component is indicative of error in the estimation of the current position due to a change in the direction of travel of the computing device. The functions also comprise determining a weight to apply to the forward error component, the sideways error component, and the orientation change error component based on average observed movement of the computing device, and using the weighted forward error component, sideways error component, and orientation change error component as constraints for determination of an updated estimation of the current position of the computing device.

In yet another example, a system is provided that comprises a means for determining an estimation of a current position of the computing device based on a previous position of the computing device, an estimated speed over an elapsed time, and a direction of travel of the computing device. The system further includes a means for determining a forward error component of the estimation of the current position of the computing device, and the forward error component is indicative of error in the estimation of the current position along a forward direction of travel of the computing device. The system also includes a means for determining a sideways error component of the estimation of the current position of the computing device, and the sideways error component is indicative of error in the estimation of the current position along a sideways direction that is substantially perpendicular to the direction of travel of the computing device. The system also includes a means for determining an orientation change error component of the estimation of the current position of the computing device, and the orientation change error component is indicative of error in the estimation of the current position due to a change in the direction of travel of the computing device. The system also includes a means for determining a weight to apply to the forward error component, the sideways error component, and the orientation change error component based on average observed movement of the computing device, and a means for using the weighted forward error component, sideways error component, and orientation change error component as constraints for determination of an updated estimation of the current position of the computing device.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Figure 1:
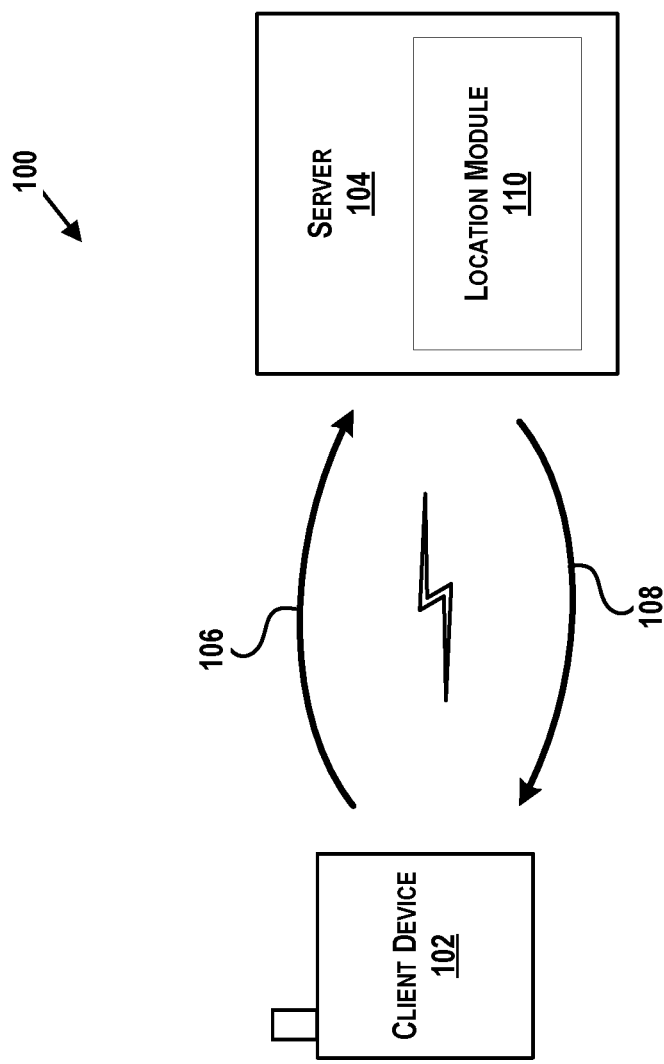
FIG. 1 illustrates an example communication system in which an example method may be implemented.

Referring now to the figures, FIG. 1 illustrates an example communication system 100 in which an example method may be implemented. In FIG. 1, a client device 102 may communicate with a server 104 via one or more wired and/or wireless interfaces. The client device 102 and the server 104 may communicate within a network. Alternatively, the client device 102 and the server 104 may each reside within a respective network.

The client device 102 may be any type of computing device or transmitter including a laptop computer, a mobile telephone, or tablet computing device, etc., that is configured to transmit data 106 to or receive data 108 from the server 104 in accordance with the method and functions described herein. The client device 102 may include a user interface, a communication interface, a processor, and data storage comprising instructions executable by the processor for carrying out one or more functions relating to the data sent to, or received by, the server 104. The user interface may include buttons, a touchscreen, a microphone, and/or any other elements for receiving inputs, as well as a speaker, one or more displays, and/or any other elements for communicating outputs.

The server 104 may be any entity or computing device arranged to carry out the method and computing device functions described herein. Further, the server 104 may be configured to send data 108 to or receive data 106 from the client device 102. The server 104 may include a location module 110 which may be configured to process the data 106 received from the client device 102 to determine a locations (present and historical) associated with the client device 102.

The data 106 received by the server 104 from the client device 102 may take various forms. For example, the client device 102 may provide information indicative of a location of the client device 102, movement of the client device 102, or inputs from a user of the client device 102. The server 104 may then process the data 106 to identify a location history that matches to the received data.

The data 108 sent to the client device 102 from the server 104 may take various forms. For example, the server 104 may send to the client device 102 an indication of location, updated location history information, or information based on the locations of the device.

Figure 2:
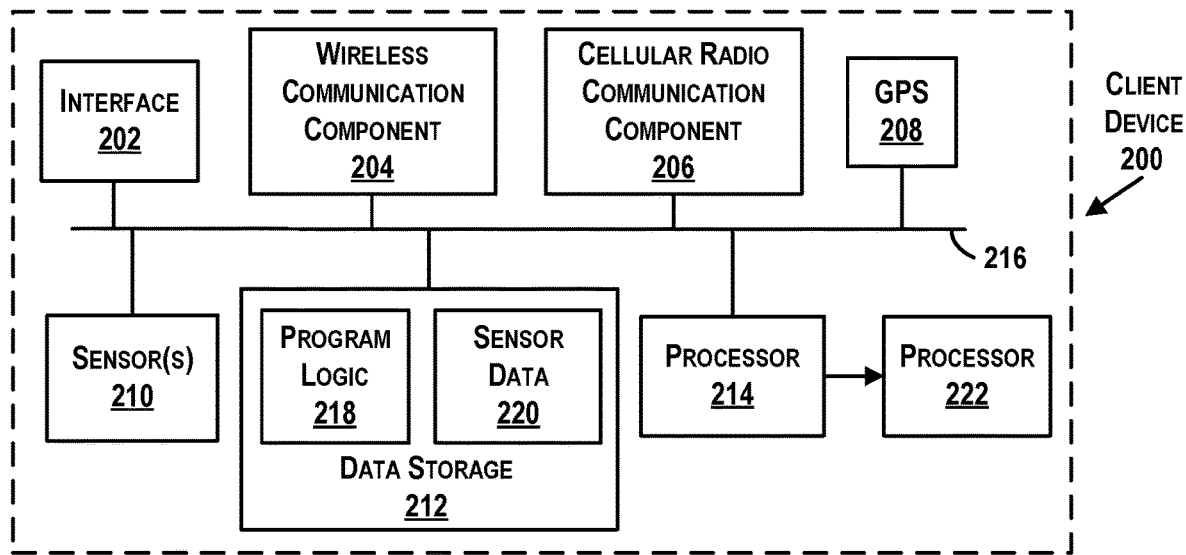
FIG. 2 illustrates a schematic drawing of an example device.

FIG. 2 illustrates a schematic drawing of an example device 200. In FIG. 2, the computing device takes a form of a client device 200. In some examples, some components illustrated in FIG. 2 may be distributed across multiple computing devices. However, for the sake of example, the components are shown and described as part of one example client device 200. The client device 200 may be or include a mobile device, desktop computer, email/messaging device, tablet computer, or similar device that may be configured to perform the functions described herein.

In some implementations, the client device 200 may include a device platform (not shown), which may be configured as a multi-layered Linux platform. The device platform may include different applications and an application framework, as well as various kernels, libraries, and runtime entities. In other examples, other formats or systems may operate the client device 200 as well.

The client device 200 may include an interface 202, a wireless communication component 204, a cellular radio communication component 206, a global position system (GPS) 208, sensor(s) 210, data storage 212, and a processor 214. Components illustrated in FIG. 2 may be linked together by a communication link 216. The client device 200 may also include hardware to enable communication within the client device 200 and between the client device 200 and another computing device (not shown), such as a server entity. The hardware may include transmitters, receivers, and antennas, for example.

The interface 202 may be configured to allow the client device 200 to communicate with another computing device (not shown), such as a server. Thus, the interface 202 may be configured to receive input data from one or more computing devices, and may also be configured to send output data to the one or more computing devices. In some examples, the interface 202 may also maintain and manage records of data received and sent by the client device 200. In other examples, records of data may be maintained and managed by other components of the client device 200. The interface 202 may also include a receiver and transmitter to receive and send data. In other examples, the interface 202 may also include a user-interface, such as a keyboard, microphone, touchscreen, etc., to receive inputs as well.

The wireless communication component 204 may be a communication interface that is configured to facilitate wireless data communication for the client device 200 according to one or more wireless communication standards. For example, the wireless communication component 204 may include a Wi-Fi communication component that is configured to facilitate wireless data communication according to one or more IEEE 802.11 standards. As another example, the wireless communication component 204 may include a Bluetooth communication component that is configured to facilitate wireless data communication according to one or more Bluetooth standards. Other examples are also possible.

The processor 214 may be configured to determine one or more geographical location estimates of the client device 200 using one or more location-determination components, such as the wireless communication component 204, the cellular radio communication component 206, or the GPS 208. For instance, the processor 214 may use a location-determination algorithm to determine a location of the client device 200 based on a presence and/or location of one or more known wireless access points within a wireless range of the client device 200. In one example, the wireless communication component 204 may determine the identity of one or more wireless access points (e.g., a MAC address) and measure an intensity of signals received (e.g., received signal strength indication) from each of the one or more wireless access points. The received signal strength indication (RSSI) from each unique wireless access point may be used to determine a distance from each wireless access point. The distances may then be compared to a database that stores information regarding where each unique wireless access point is located. Based on the distance from each wireless access point, and the known location of each of the wireless access point, a location estimate of the client device 200 may be determined.

In another instance, the processor 214 may use a location-determination algorithm to determine a location of the client device 200 based on nearby cellular base stations. For example, the cellular radio communication component 206 may be configured to at least identify a cell from which the client device 200 is receiving, or last received, signal from a cellular network. The cellular radio communication component 206 may also be configured to measure a round trip time (RTT) to a base station providing the signal, and combine this information with the identified cell to determine a location estimate. In another example, the cellular communication component 206 may be configured to use observed time difference of arrival (OTDOA) from three or more base stations to estimate the location of the client device 200.

In still another instance, the processor 214 may use a location-determination algorithm to determine a location of the client device 200 based on signals sent by GPS satellites above the Earth. For example, the GPS 208 may be configured to estimate a location of the mobile device by precisely timing signals sent by the GPS satellites.

In some examples, the processor 214 may use a location-determination algorithm that combines location estimates determined by multiple location-determination components, such as a combination of the wireless communication component 204, the cellular radio component 206, and the GPS 208.

The sensor 210 may include one or more sensors, or may represent one or more sensors included within the client device 200. Example sensors include an accelerometer, gyroscope, pedometer, light sensors, microphone, camera, or other location and/or context-aware sensors.

The data storage 212 may store program logic 218 that can be accessed and executed by the processor 214. The data storage 210 may also store collected sensor data 220 that may include data collected by any of the wireless communication component 204, the cellular radio communication component 206, the GPS 208, and any of sensors 210.

The communication link 216 is illustrated as a wired connection; however, wireless connections may also be used. For example, the communication link 216 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

The client device 200 is illustrated to include an additional processor 222. The processor 222 may be configured to control other aspects of the client device 200 including displays or outputs of the client device 200 (e.g., the processor 222 may be a GPU). Example methods described herein may be performed individually by components of the client device 200, or in combination by one or all of the components of the client device 200. In one instance, portions of the client device 200 may process data and provide an output internally in the client device 200 to the processor 222, for example. In other instances, portions of the client device 200 may process data and provide outputs externally to other computing devices.

Figure 3:
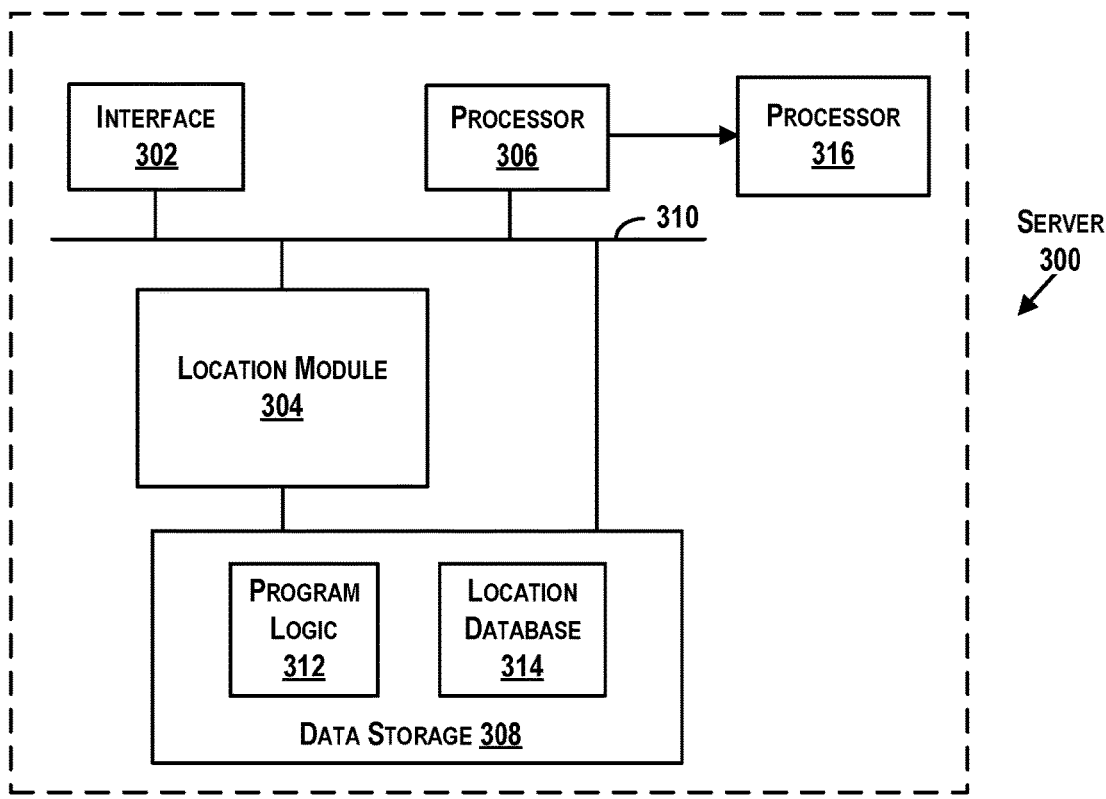
FIG. 3 illustrates a schematic drawing of another example computing device.

FIG. 3 illustrates a schematic drawing of another example computing device. In FIG. 3, the computing device takes a form of a server 300. In some examples, some components illustrated in FIG. 3 may be distributed across multiple servers. However, for the sake of example, the components are shown and described as part of one example server 300. The server 300 may be a computing device, cloud, or similar entity that may be configured to perform the functions described herein.

The server 300 may include a communication interface 302, a location module 304, a processor 306, and data storage 308. All of the components illustrated in FIG. 3 may be linked together by a communication link 310 (e.g., wired or wireless link). The server 300 may also include hardware to enable communication within the server 300 and between the server 300 and another computing device (not shown). The hardware may include transmitters, receivers, and antennas, for example.

The communication interface 302 may allow the server 300 to communicate with another device (not shown), such as a mobile phone, personal computer, etc. Thus, the communication interface 302 may be configured to receive input data from one or more computing devices, and may also be configured to send output data to the one or more computing devices. In some examples, the communication interface 302 may also maintain and manage records of data received and sent by the server 300. In other examples, records of data may be maintained and managed by other components of the server 300.

The location module 304 may be configured to receive data from a client device and determine a geographic location of the client device. The determination may be based on outputs of an accelerometer, gyroscope, or other sensors of the client device, as well as based on location determinations of the client device. The location module 304 may further be configured to determine and store a history of sensor measurements of the client device for later reprocessing based on updated data pertaining to networks or information used to the determine the locations.

The data storage 308 may store program logic 312 that can be accessed and executed by the processor 306. The data storage 310 may also include a location database 314 that can be accessed by the processor 306 as well, for example, to retrieve information regarding wireless access points, locations of satellites in a GPS network, floor plans of a building, etc., or any other type of information useful for determining a location of a client device.

The server is illustrated with a second processor 316 which may be an application specific processor for input/output functionality. In other examples, functions of the processor 306 and the processor 316 may be combined into one component.

Within examples, measurements collected from various sensors of a device (such as WiFi components, GPS sensors, and inertial sensors) can be combined with information from external databases (such as known locations of WiFi access points or building floor plans) to estimate a location or movement of the device in real-time. Recording the real-time location estimate at all times (or intervals/increments of time) may also produce a location history.

Figure 4:
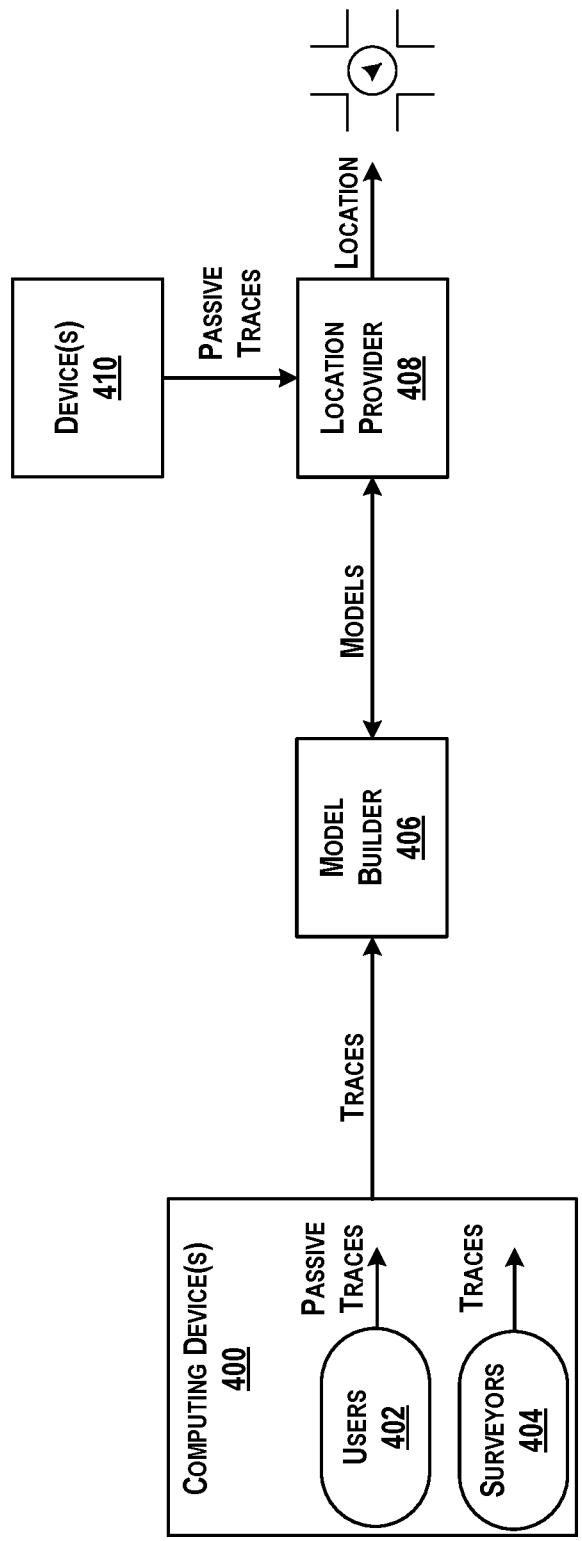
FIG. 4 is a flow diagram illustrating an example method for determining a location or movement of a device.

FIG. 4 is a flow diagram illustrating an example method for determining a location or movement of a device. Initially, computing device(s) 400, operated by users 402 or surveyors 404, may traverse areas in an environment and output traces to a model builder 406. A device operated by a user 402 may output traces passively (i.e., the device may be configured to output the trace data with no additional user input), including raw data output by sensors of the device like WiFi scans, GPS data, accelerometer data, etc. Each trace may be associated with a time the data was collected, and thus, for traces that include GPS data, other data in the traces also has location-specific references. A device operated by a surveyor 404 may have location-specific references for all traces, whether due to associated GPS data or manual input of location information.

The model builder 406 may be a module on a computing device or server, and may be configured to generate a model of the environment based on the received traces. The model builder 406 may include a trace localizer and a map builder. The model builder 406 may access reference data such as information like strength of signal (RSSI) for WiFi access points in the environment at specific locations in the environment, or other landmark data of the environment. The model builder 406 may be configured to generate a map or path of the device based on the traces. In one example, the model builder 406 may utilize GPS data to determine locations of the device over time, utilize dead reckoning (based on accelerometer and gyroscope outputs) to project a path, and optimize the path by jointly combining each. The model builder 406 may further optimize the path to match WiFi scan data to the reference WiFi maps to align a path that most likely resembles a path that the device traversed through the environment.

A location provider 408 may access a model output by the model builder 406 to determine locations of other device(s) 410 based on provided passive traces as well. Within examples, the location provider 408 may return a location of the device or an estimation of movement of the device to the device 410 based on data received in the traces.

Traces received from devices may include a variety of measurements from multiple different sensors, and may include a variety of measurements collected over time or at various locations. A trace may refer to a sensor log or a collection of data output from sensors on the device over some time period. The sensors that output data may be selected, or data to be included within the sensor log may also be selected. In some examples, a trace of data may include all data collected by a device (using a number of sensors) over a given time frame (e.g., about 5 seconds, or perhaps about 5 minutes long). Measurements in a trace or from trace to trace may be considered statistically independent. However, in instances in which the measurements are collected from positions/locations in close proximity or collected close in time, the measurements may have correlations. To reflect the fact that time or position can influence measurement noises, information from measurements that are close in time or in space can be discounted so as to down-weight information received from each measurement, such that when a same or similar data measurement is observed more than once that satisfies the time or position correlation, the measurements can be assigned weights to discount the information. By discounting correlated measurements, errors in such measurements may not be considered more heavily within estimations of location or movement of the device. Also, however, by discounting correlated measurements, all information including erroneous noise signals as well as correct data measurements, are discounted, and thus some information may be lost.

Figure 5:
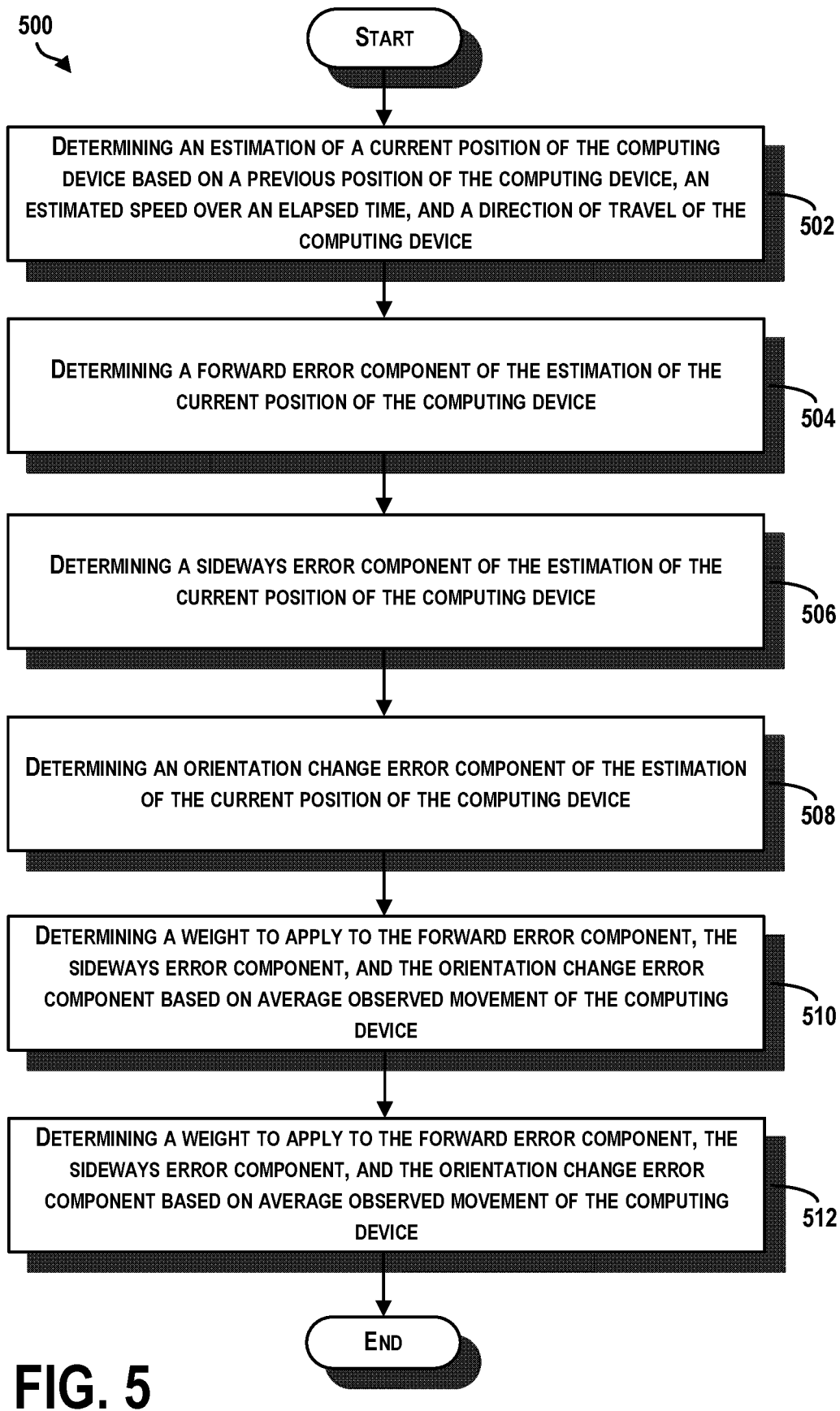
FIG. 5 is a block diagram of an example method of determining error components of an estimation of position of a computing device, in accordance with at least some embodiments described herein.

FIG. 5 is a block diagram of an example method of determining error components of an estimation of position of a computing device, in accordance with at least some embodiments described herein. Method 500 shown in FIG. 5 presents an embodiment of a method that, for example, could be used with the system 100 in FIG. 1, the device 200 in FIG. 2, the server 300 in FIG. 3, or the system in FIG. 4, for example, or may be performed by a combination of any components of in FIGS. 1-4. Method 500 may include one or more operations, functions, or actions as illustrated by one or more of blocks 502-512. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 500 and other processes and methods disclosed herein, each block in FIG. 5 may represent circuitry that is wired to perform the specific logical functions in the process.

Functions of the method 500 may be fully performed by a computing device (or components of a computing device), or may be distributed across multiple computing devices and/or a server. In some examples, the computing device may receive information from sensors of the computing device, or where the computing device is a server the information can be received from another device that collects the information. The computing device could further communicate with a server to determine the matching media files, for example.

At block 502, the method 500 includes determining an estimation of a current position of the computing device based on a previous position of the computing device, an estimated speed over an elapsed time, and a direction of travel of the computing device. Within examples, information indicating a previous position may be received from a server that calculates or determines the information due to communication with the computing device, or from sensors of the computing device including a GPS sensor. The previous position may also be derived or calculated from a number of data points such as GPS location determinations, or WiFi scans and associated WiFi mappings.

The estimated speed can also be received from a server, or derived or calculated from position determinations over the elapsed time or based on other data over the elapsed time including outputs of a pedometer, for example. Using a known or estimated distance traveled (as derived or calculated from outputs of a pedometer, outputs of an accelerometer inferring a step has been taken, or other sensor data), a speed can be determined based on the elapsed time.

The direction of travel of the computing device may similarly be determined from data received from a server, or from sensors on-board the computing device such as a magnetometer or compass, for example. Any available information may be used to infer a direction of travel including a fusion of accelerometer, gyroscope, and optionally magnetometer data, for example. In still other examples, other available information can be used to provide further estimates (directly or indirectly) as to direction of travel, including WiFi scans received in traces that may give information as to a position and heading of a device and/or user.

The estimation of the current position of the computing device can be determined based on a dead reckoning calculation. As an example, an accelerometer of the computing device can be used as a pedometer and a magnetometer as a compass heading provider. Each step of a user of the computing device causes a position to move forward a fixed distance in a direction measured by the compass. Accuracy may be limited by precision of the sensors, magnetic disturbances inside structures of the computing device, and unknown variables such as carrying position of the computing device and stride length of the user. However, the estimate of the current position can be determined in this manner.

At block 504, the method 500 includes determining a forward error component of the estimation of the current position of the computing device. The forward error component is indicative of error in the estimation of the current position along a forward direction of travel of the computing device. The forward error component is representative of an error vector between the estimation of the current position of the computing device based on dead reckoning and an estimation of the current position of the computing device based on all available information (e.g., GPS, WiFi scans, etc.) along the forward direction of travel of the computing device.

In some examples, the forward error component is determined based on comparison of the estimation of the current position of the computing device with a projection of a current position of the computing device using an average human step length. For example, an average human step length can be used to project where the computing device is currently positioned based on the previous position. As one example, an average human step length may be between about 50 cm to about 1 meter, or may be dependent upon a specific user of the computing device (e.g., such as age, gender, height, and weight). The current position estimation may indicate a position a forward distance of about 1 meter from the previous position, while the average human step length used may be 50 cm. Thus, in this example, the forward error component may be a vector of about 50 cm, which covers an area of possible error in the forward direction of the estimated current position. The average human (or user) step length can also be a variable optimized over time. In this specific example, the forward error may be computed using a specific user's average step length instead of the average human step length. Thus, within examples, a specific user's average step length may be known or learned over time, and used instead of a generic average step length of all humans (based on data collected over time from many individuals).

At block 506, the method 500 includes determining a sideways error component of the estimation of the current position of the computing device. The sideways error component is indicative of error in the estimation of the current position along a sideways direction that is substantially perpendicular to the direction of travel of the computing device. The sideways error component is representative of an error vector between the estimation of the current position of the computing device based on dead reckoning and an estimation of current position of the computing device based on all available information along the sideways direction that is substantially perpendicular to the direction of travel of the computing device.

In some examples, like the forward error component, the sideways error component can be determined based on comparison of the estimation of the current position of the computing device with a projection of a current position of the computing device using an average human step direction. For example, an average human step direction may be about the same direction as previously traveled so as to travel in an approximate straight line. In this example, the projection may result in the user walking straight. The sideways error component may then be a difference between the projected position and the estimated position along a vector that is perpendicular to the direction of travel of the computing device.

In other examples, an output of a gyroscope or a compass of the computing device may be used to determine a direction or change of direction of travel. The change of direction can then be used to project a sideways direction change and sideways error component.

At block 508, the method 500 includes determining an orientation change error component of the estimation of the current position of the computing device. The orientation change error component is indicative of error in the estimation of the current position due to a change in the direction of travel of the computing device (or error in estimated change in orientation between previous and current position of the device). The orientation change error component is representative of an error vector between the estimation of the current position of the computing device based on dead reckoning and an estimation of current position of the computing device based on all available information due to the change in the direction of travel of the computing device.

In some examples, outputs from a gyroscope or compass of the computing device can be received, and changes in the direction of travel of the computing device can be based on the outputs from the gyroscope. The orientation change error component can be determined based on comparison of the estimation of the current position of the computing device with a projection of a current position of the computing device taking into account a gyroscope bias. For instance, the current position estimation may be based on the direction of travel as derived from the gyroscope outputs. However, the gyroscope outputs may have some bias associated with them due to sensor imperfections, and the bias (when known or calculated) can be used to project a position of the computing device, and the orientation change error component may be a direction in an angle or heading between the projected and estimated current positions.

At block 510, the method 500 includes determining, by a processor, a weight to apply to the forward error component, the sideways error component, and the orientation change error component based on average observed movement of the computing device. The average observed movement of the computing device may be based on several factors. In some examples, the movement may be observed over time, and thus, based on specific movement characteristics of the user of the device (e.g., the user generally takes strides of about 1 meter, etc.). Average movement may also be calculated due to a statistical calculation from data received from many devices over time, or based on movement of an average human of average size, height, weight, etc. In some examples, data output from one or more sensors of the computing device (e.g., of a GPS sensor, an accelerometer, a gyroscope, a WiFi transceiver, and a magnetometer) indicating movement of the computing device can be received over time, and the average observed movement of the computing device can be determined based on the data output from the one or more sensors.

The weight to apply to the error components can be different for each error component. In some examples, the weight (or a magnitude of the weight) can be chosen as an inverse of an experimental standard deviation of those errors, so that in average, each error component represents a similar contribution to a cost function. Those weights can also be derived from noises of the sensors that are used to estimate the speed and orientation changes, for example. For a component for which typical deviations are large, a small can be used, so that the error in this component does not overly influence changes to the estimated current position. The weight may be a fraction, when the typical deviation of that component is large (or exceeds a threshold like more than the average step length) so as to reduce effects of this error component on the position estimation.

In further examples, weights may be determined before looking at the errors, and rather, based on previous errors seen or observed over many datasets from other devices. A number of traces from many devices may be used to determine averages of weights to apply over time.

The weight may be useful to prevent an error component from overly influencing changes to updated estimations of the current position of the computing device.

At block 512, the method 500 includes using, by the processor, the weighted forward error component, sideways error component, and orientation change error component as constraints for determination of an updated estimation of the current position of the computing device. For example, the weight can be applied to the forward error component, the sideways error component, and the orientation change error component to determine the updated estimation of the current position of the computing device.

In some examples, additional information may also be received and used as additional constraints. For instance, a position measurement from a GPS sensor of the computing device can be received and used as a further constraint for determination of the updated estimation of the current position of the computing device. In this manner, a dead reckoning constraint as well as a direct position measurement (GPS) can be used to influence updates to the current position estimations. A higher weight on the error components of the dead reckoning estimation enables a larger influence on the estimations.

Within examples, the method 500 in FIG. 5 performs a linearization of error components of the estimation of the current position of the computing device resulting in the forward error component, the sideways error component, and the orientation change error component. Applying a weight to the error components helps to capture dynamics of a person walking to attempt to ensure that segments appear like walking paths, and to provide consistency to the estimations.

The three error components may be considered to provide three constraints including one for a gyroscope bias, one for a step length, and one for a step direction, for example. Specifically, a first constraint on a device location may include dead reckoning data that links a location of a user between two steps. Using a given example, a user likely takes a step that is about three feet in front of a previous step, and probably in the same general direction. If the user turned, an angle of turn can be inferred from gyroscope data. Thus, every time a user takes a step, it is expected that the step to be one step forward. A difference between a first position and the resulting expected position can be solved using non-linear geometry. However, using methods described herein, the non-linear geometry can be decomposed into three separate linear components to linearize estimate of error along the forward and sideways directions. Further, applying a factor for each component helps to consider the components in a way that synthesizes a user walking. If a forward error is large, this may simply represent a user taking a large step, however, since large steps are less likely to occur, a weight can be applied to such a forward component.

Figure 6:
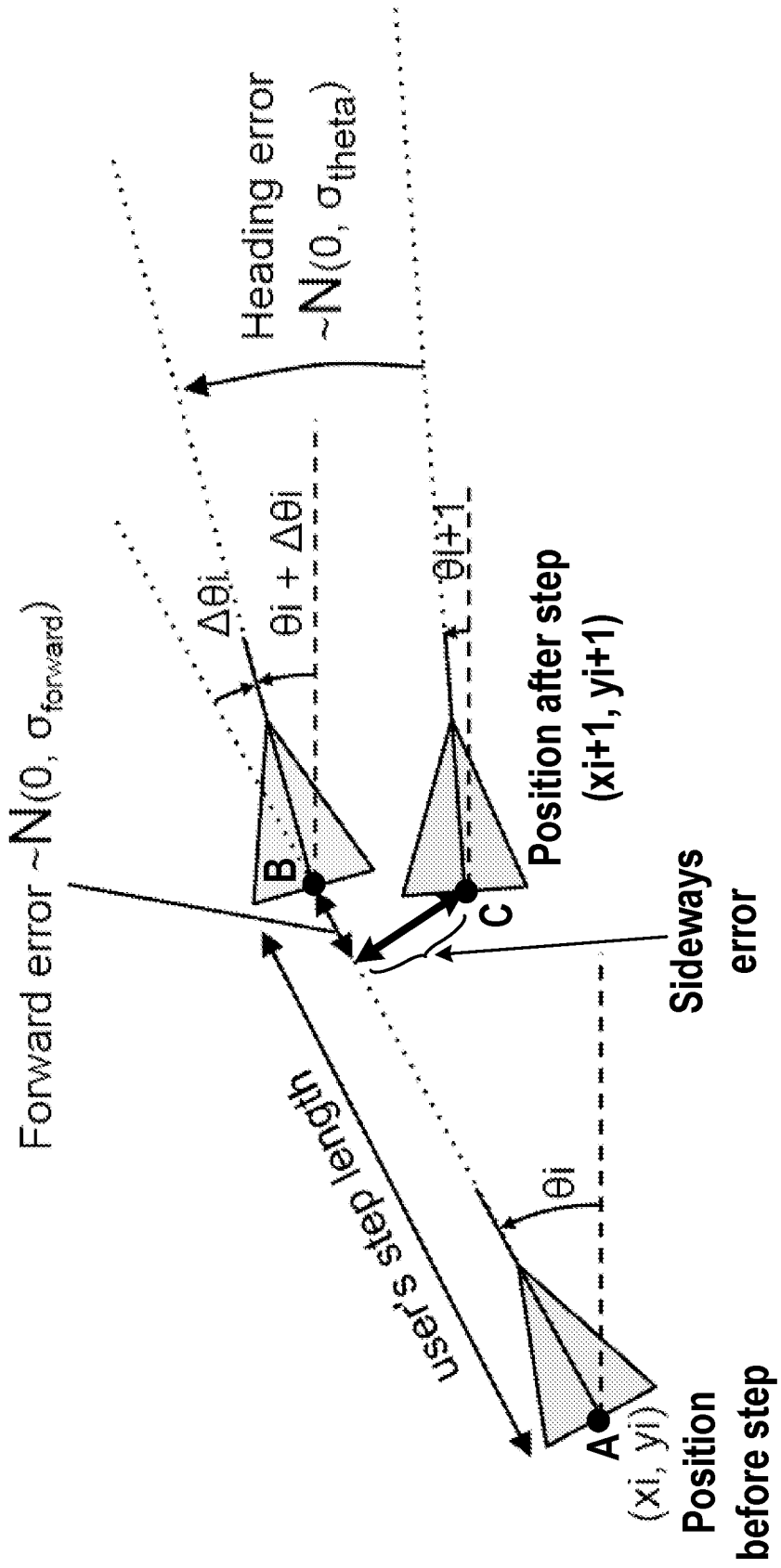
FIG. 6 is a conceptual diagram illustrating an example determination of error components of an estimation of position of a computing device.

FIG. 6 is a conceptual diagram illustrating an example determination of error components of an estimation of position of a computing device. In FIG. 6, a displacement of the computing device before a movement or step is labeled as "A (xi, yi)", and a user's step length is shown. An estimation of a current position of the computing device after the user's step based on the previous position of the computing device, an estimated speed over an elapsed time, and a direction of travel of the computing device is labeled as "B", and the currently estimated position of the computing device after the step based on all information (e.g., GPS, WiFi, other dead reckoning data) is labeled as "C (xi+1, yi+1)". Since the actual position or orientation of the device or user is not known, there is a current estimate, and positions labeled A and C are current estimates of the position of the user at time ti and ti+1. Those estimates are based on all data from the device. The position labeled B is the position estimate of the user at time ti+1 based only on dead reckoning estimates after one step from A. If the dead reckoning and estimates were perfect, B and C would be identical. But errors in the current estimates (A and C) and errors in the dead reckoning (A to B) may cause those two to differ. The errors can thus be determined as relative (rather than absolute) to the estimated positions.

The forward error component of the estimation of the current position of the computing device is labeled with an error vector, and is determined based on error in the estimation of the current position along a forward direction of travel of the computing device (or a difference between position B and C along a projection of the direction of travel). The sideways error component of the estimation of the current position of the computing device is also labeled with an error vector, is determined based on error in the estimation of the current position along a sideways direction that is substantially perpendicular to the direction of travel of the computing device (or a perpendicular position difference between position B and C).

The orientation change error component of the estimation of the current position of the computing device is further labeled with a heading error vector, and is based on error in the estimation of the current position due to a change in the direction of travel of the computing device. The orientation change error may be computed by a difference between the expected orientation given the previous orientation and the measured change of orientation, and the current orientation estimate, based on all other information.

As shown, the triangles represent arrow heads indicating a direction of travel of the computing device, and the direction of travel changed from position A to C. The direction of travel at position A may be described by angle $\theta_i$, the direction of travel at position B is $(\theta_i + \Delta\theta_i)$, and the direction of travel at position C is represented by $(\theta_i+1)$. The orientation change error component is $\Delta\theta_i$, which can be determined from the on-board sensors.

A weight may be applied to the forward, sideways, and orientation change error components based on average observed movements of the computing device, to reduce influence of measurements indicating abnormal movement of the device upon estimations of movement of the device.

Figure 7:
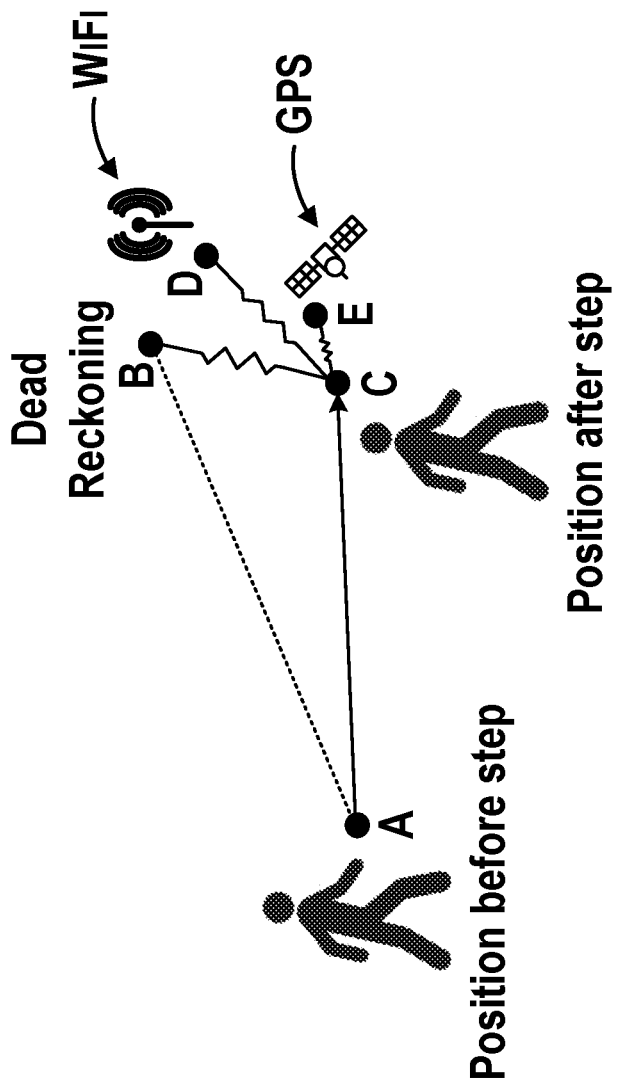
FIG. 7 is another conceptual diagram illustrating an example determination of an updated estimation of position of a computing device.

FIG. 7 is another conceptual diagram illustrating an example determination of an updated estimation of position of a computing device. In FIG. 7, a previous position of a user is labeled as "A", and a position after a step is labeled as "C" (similar to FIG. 6). A computing device of the person may yield number data from which estimations of the position after the step can be inferred. Example estimations of positions after the step are shown as may be determined from dead reckoning (labeled as "B"), WiFi signal maps (labeled as "D"), and GPS (labeled as "E"). Each of the data may have an error associated with the estimation, and as described above, the dead reckoning errors may be decomposed into weighted forward, sideways, and orientation change error components based on average observed movement of the computing device. Using this method, the weighted dead reckoning error components, and the other data indicating other estimations of position, may be utilized as constraints for determination of an updated estimation of the current position of the computing device. In FIG. 7, each estimation at positions B, D, and E are shown to pull the estimation of position closer to the position at C. The current estimate of the device according to all information available is represented by position C.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method comprising:
   determining, by a processor, an estimation of a current position of a computing device based on (i) one or more signals received from one or more wireless access points and (ii) known locations of the one or more wireless access points;
   determining, by the processor, a weight to apply to at least one error component of the estimation of the current position of the computing device based on sensor data indicative of movement of the computing device and generated by at least one sensor of the computing device, wherein the error component is indicative of error in the estimation of the current position along at least one direction of movement of the computing device; and
   using, by the processor, the at least one weighted error component as a constraint for determination of an updated estimation of the current position of the computing device.

2. The computer-implemented method of claim 1, further comprising:
   determining, by the processor, the at least one error component of the estimation of the current position of the computing device based on the sensor data indicative of movement of the computing device and generated by the at least one sensor of the computing device, wherein the at least one error component comprises a forward error component of the estimation of the current position of the computing device, and wherein the forward error component is indicative of error in the estimation of the current position along a forward direction of movement of the computing device.

3. The computer-implemented method of claim 1, further comprising:
determining, by the processor, the at least one error component of the estimation of the current position of the computing device based on the sensor data indicative of movement of the computing device and generated by the at least one sensor of the computing device, wherein the at least one error component comprises a sideways error component of the estimation of the current position of the computing device, and wherein the sideways error component is indicative of error in the estimation of the current position along a sideways direction of movement of the computing device.

4. The computer-implemented method of claim 1, further comprising:
determining, by the processor, the at least one error component of the estimation of the current position of the computing device based on the sensor data indicative of movement of the computing device and generated by the at least one sensor of the computing device, wherein the at least one error component comprises an orientation change error component of the estimation of the current position of the computing device, and wherein the orientation change error component is indicative of error in the estimation of the current position due to a change in the direction of movement of the computing device.

5. The computer-implemented method of claim 1, wherein determining the weight to apply to the at least one error component of the estimation of the current position of the computing device comprises:
determining the weight based on prior observed movement of the computing device, wherein the sensor data is indicative of the prior observed movement of the computing device.

6. The computer-implemented method of claim 5, wherein the prior observed movement of the computing device comprises an average observed movement of the computing device.

7. The computer-implemented method of claim 1, wherein determining the estimation of the current position of the computing device comprises:
determining a first estimation of the current position of the computing device by way of a first calculation; and
determining a second estimation of the current position of the computing device by way of a second calculation, wherein the second calculation is different from the first calculation, and wherein the error component is based on a comparison of the first estimation of the current position of the computing device with the second estimation of the current position of the computing device.

8. The computer-implemented method of claim 7, wherein the at least one sensor of the computing device comprises a plurality of sensors, wherein the first calculation is based on a first set of sensor data acquired from a first set of sensors of the plurality of sensors, wherein the second calculation is based on a second set of sensor data acquired from a second set of sensors of the plurality of sensors, and wherein the second set of sensor data is different from the first set of sensor data.

9. The computer-implemented method of claim 7, wherein the first calculation is based on sensor data acquired from the at least one sensor of the computing device at a first time, and wherein the second calculation is based on an estimation of a previous position of the computing device at a second time preceding the first time.

10. The computer-implemented method of claim 7, wherein determining the weight to apply to the at least one error component of the estimation of the current position of the computing device comprises:
determining a magnitude of the weight to be inversely proportional to a standard deviation of the first estimation of the current position of the computing device from the second estimation of the current position of the computing device.

11. The computer-implemented method of claim 1, wherein determining the estimation of the current position of the computing device based on (i) the one or more signals received from one or more wireless access points and (ii) the known locations of the one or more wireless access points comprises:
determining, based on the one or more signals, one or more identities of the one or more wireless access points;
obtaining, based on the one or more identities of the one or more wireless access points and from a database, the known locations of the one or more wireless access points;
measuring one or more intensities of the one or more signals received from the one or more wireless access points;
determining, based on the one or more intensities, one or more distances between the computing device and the one or more wireless access points;
comparing the one or more distances to the known locations of the one or more wireless access points; and
determining the estimation of the current position of the computing device based on comparing the one or more distances to the known locations of the one or more wireless access points.

12. The computer-implemented method of claim 1, wherein each respective signal of the one or more signals received from one or more wireless access points comprises a received signal strength indication.

13. The computer-implemented method of claim 1, wherein determining the estimation of the current position of the computing device further comprises:
determining the estimation of the current position of the computing device based on a dead reckoning calculation.

14. The computer-implemented method of claim 1, wherein determining the estimation of the current position of the computing device further comprises:
determining the estimation of the current position of the computing device further based on positioning data received from one or more positioning satellites.

15. The computer-implemented method of claim 1, further comprising:
receiving, by the processor, outputs from a gyroscope of the computing device; and
determining, by the processor, the at least one direction of movement of the computing device based on the outputs from the gyroscope.

16. The computer-implemented method of claim 1, wherein the at least one sensor of the computing device comprises at least one of: (i) a transceiver configured to communicate with one or more positioning satellites, (ii) an accelerometer, (iii) a gyroscope, (iv) a magnetometer, (v) an IEEE 802.11 transceiver, or (vi) a cellular network transceiver.

17. A non-transitory computer-readable storage medium having stored thereon instructions that, when executed by a processor, cause the processor to perform operations comprising:
   determining an estimation of a current position of a computing device based on (i) one or more signals received from one or more wireless access points and (ii) known locations of the one or more wireless access points;
   determining a weight to apply to at least one error component of the estimation of the current position of the computing device based on sensor data indicative of movement of the computing device and generated by at least one sensor of the computing device, wherein the error component is indicative of error in the estimation of the current position along at least one direction of movement of the computing device; and
   using the at least one weighted error component as a constraint for determination of an updated estimation of the current position of the computing device.

18. The non-transitory computer-readable storage medium of claim 17, wherein determining the estimation of the current position of the computing device comprises:
   determining a first estimation of the current position of the computing device by way of a first calculation; and
   determining a second estimation of the current position of the computing device by way of a second calculation, wherein the second calculation is different from the first calculation, and wherein the error component is based on a comparison of the first estimation of the current position of the computing device with the second estimation of the current position of the computing device.

19. The non-transitory computer-readable storage medium of claim 18, wherein the at least one sensor of the computing device comprises a plurality of sensors, wherein the first calculation is based on a first set of sensor data acquired from a first set of sensors of the plurality of sensors, wherein the second calculation is based on a second set of sensor data acquired from a second set of sensors of the plurality of sensors, and wherein the second set of sensor data is different from the first set of sensor data.

20. A computing system comprising:
   a processor; and
   data storage configured to store instructions that, when executed by the processor, cause the processor to perform operations comprising:
      determining an estimation of a current position of a computing device based on (i) one or more signals received from one or more wireless access points and (ii) known locations of the one or more wireless access points;
      determining a weight to apply to at least one error component of the estimation of the current position of the computing device based on sensor data indicative of movement of the computing device and generated by at least one sensor of the computing device, wherein the error component is indicative of error in the estimation of the current position along at least one direction of movement of the computing device; and
      using the at least one weighted error component as a constraint for determination of an updated estimation of the current position of the computing device.

\* \* \* \* \*